(No Model.)
W. MILLSPAUGH.
TOOL HANDLE.
No. 366,859. Patented July 19, 1887.
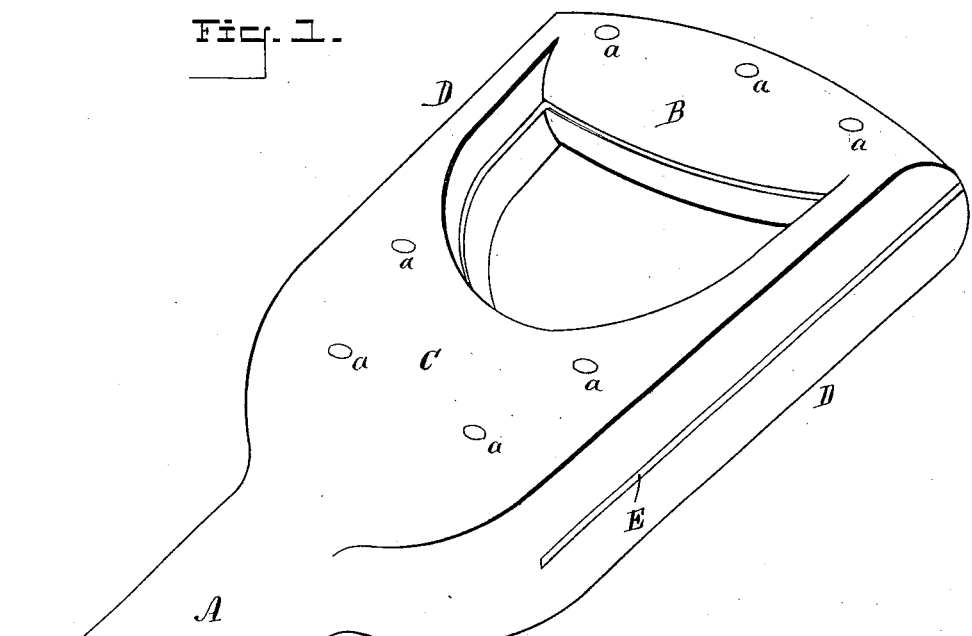
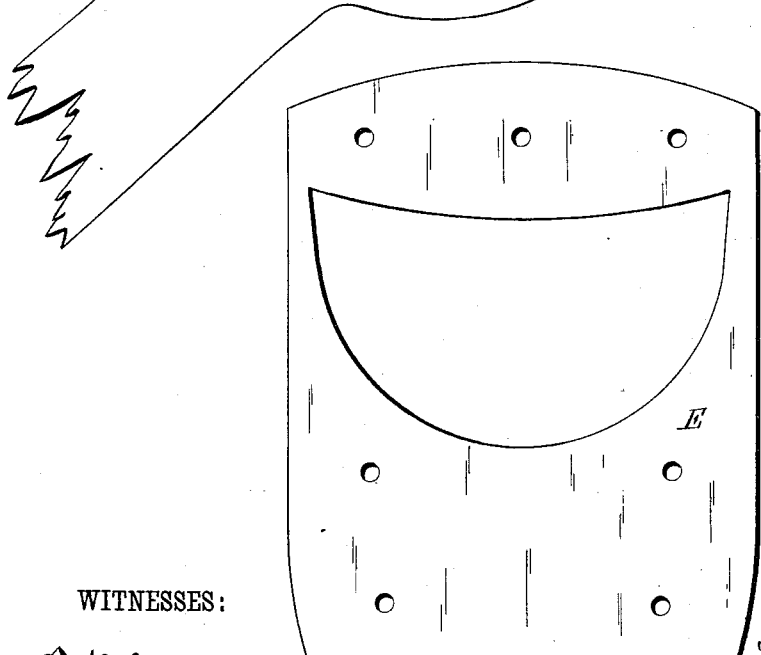
WITNESSES:
INVENTOR:
W. Millspaugh
BY Munn & Co.
ATTORNEYS.
N. PETERS, Photo-Lithographer, Washington, D. C.

UNITED STATES PATENT OFFICE.

WILLIAM MILLSPAUGH, OF MIDDLETOWN, NEW YORK.

TOOL-HANDLE.

SPECIFICATION forming part of Letters Patent No. 366,859, dated July 19, 1887.

Application filed May 18, 1887. Serial No. 238,624. (No model.)

*To all whom it may concern:*

Be it known that I, WILLIAM MILLSPAUGH, of Middletown, in the county of Orange and State of New York, have invented a new and Improved Tool-Handle, of which the following is a specification, reference being had to the annexed drawings, forming a part thereof, in which—

Figure 1 is a perspective view of my improved tool-handle, and Fig. 2 is a detail view of the strengthening-plate detached from the handle.

Similar letters of reference indicate corresponding parts in both figures.

The handles of such tools as shovels, forks, and spades, as ordinarily made, are apt to split and become worthless. The object of my invention is to strengthen the handles of such tools, so that they will not be liable to split.

My invention consists in the combination, with a handle, such as a shovel-handle having a central grip supported by side arms and split longitudinally through the grip, the arms, and the body of the handle, of a strengthening-plate adapted to be inserted between the parts of the handle and clamped therein by rivets or otherwise, all as hereinafter more fully described.

In carrying out my invention I take the ordinary handle, A, provided with the grip B, and connected with the body C of the handle by side arms, D, and I split the handle longitudinally by means of a saw or otherwise, and insert in the saw-kerf thus formed a strengthening-plate, E, of any suitable material, such as iron, steel, or other sheet metal, or wood, the plate having substantially the same outline as the longitudinal central section of the handle. The said plate is secured in position in the handle in any suitable way, preferably by means of rivets *a*, passing through holes in the handle and corresponding holes in the strengthening-plate. The plate thus inserted and secured in place in the handle prevents the warping of the handle, and also prevents it from being split by blows or hard usage, and in the case of the splitting of the handle by shrinkage the plate E retains all of the parts in their original relation to each other.

Having thus fully described my invention, I claim as new and desire to secure by Letters Patent—

1. The combination, with a longitudinally-split handle, A, provided with a grip, B, body C, and arms D, of a strengthening-plate, E, inserted in the handle and secured between the parts separated by the split, substantially as described.

2. As an improved article of manufacture, a tool-handle, A, split longitudinally through the grip B, arms D, and partly through the body C, and the plate E, inserted between the parts separated by the split and having the general form of the longitudinal central section of the handle, the parts of the handle and the plate E being fastened together by rivets *a*, substantially as described.

3. As an article of manufacture, a flat apertured strengthening-plate, E, having the general outline of the longitudinal section of the grip, the arms, and body of the handle, substantially as described.

WM. MILLSPAUGH.

Witnesses:
GEO. M. HOPKINS,
C. SEDGWICK.